(12) United States Patent
Pollard et al.

(10) Patent No.: US 8,270,047 B2
(45) Date of Patent: Sep. 18, 2012

(54) IMAGE PROCESSING METHOD, IMAGE CAPTURE DEVICE, AND COMPUTER READABLE MEDIUM FOR FORMING AN IMAGE BASED ON SPATIAL FREQUENCY COMPONENTS

(75) Inventors: Stephen Pollard, Dursley (GB); Andrew Hunter, Bristol (GB); Renato Keshet, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 659 days.

(21) Appl. No.: 12/146,577

(22) Filed: Jun. 26, 2008

(65) Prior Publication Data

US 2009/0009831 A1    Jan. 8, 2009

(30) Foreign Application Priority Data

Jul. 5, 2007 (GB) .................................. 0712984.4

(51) Int. Cl.
*H04N 1/46* (2006.01)
(52) U.S. Cl. ......... 358/514; 358/1.9; 358/505; 358/512; 358/474; 250/208.1; 250/208.2; 250/208.3; 250/226; 257/291; 257/292; 257/432; 348/272; 348/273; 348/276; 348/277; 348/294
(58) Field of Classification Search .................. None
See application file for complete search history.

(56) References Cited

U.S. PATENT DOCUMENTS

| | | | | |
|---|---|---|---|---|
| 5,773,814 A * | 6/1998 | Phillips et al. | ............. | 250/208.1 |
| 6,831,262 B2 * | 12/2004 | Nagashima | ................. | 250/208.1 |
| 6,961,157 B2 * | 11/2005 | Tandon et al. | ................. | 358/512 |
| 7,027,193 B2 * | 4/2006 | Spears et al. | ................... | 358/471 |
| 7,057,155 B2 * | 6/2006 | Tan et al. | ........................ | 250/226 |
| 7,082,218 B2 * | 7/2006 | Pollard et al. | ................. | 382/167 |
| 7,518,769 B2 * | 4/2009 | Sakakibara et al. | ........... | 358/514 |
| 7,782,364 B2 * | 8/2010 | Smith | ......................... | 348/218.1 |
| 7,796,297 B2 * | 9/2010 | Pollard et al. | .................. | 358/1.9 |
| 2002/0181033 A1 | 12/2002 | Tandon et al. | | |
| 2003/0063201 A1 * | 4/2003 | Hunter et al. | ................. | 348/241 |
| 2005/0117181 A1 * | 6/2005 | Hokoi | ............................ | 358/302 |
| 2005/0157319 A1 * | 7/2005 | Mizuhashi et al. | ............ | 358/1.9 |
| 2007/0053022 A1 * | 3/2007 | Misaka | ......................... | 358/518 |

FOREIGN PATENT DOCUMENTS

EP             0 698 94 B1      2/2000

OTHER PUBLICATIONS

UK Search Reported in co-pending application No. GB0701984.4, mailed Jun. 30, 2008.

* cited by examiner

*Primary Examiner* — Dung Tran (57) ABSTRACT

First, second, and third image planes are obtained from at least one image sensor. The first image plane is formed from light of a first spectral distribution. The second image plane is formed from light of a second spectral distribution. The third image plane is formed from light of a spectral distribution which substantially covers the visible spectrum. First spatial frequency components are generated from the first, second and third image planes. A second spatial frequency component is generated from the third image plane. A color transform is applied to the first spatial frequency components from the first, second, and third image planes to obtain at least first, second and third transformed first spatial frequency image planes. The at least first, second and third transformed first spatial frequency image planes are combined with the second spatial frequency component from the third image plane to form an image.

20 Claims, 6 Drawing Sheets

IMAGE PROCESSING METHOD, IMAGE CAPTURE DEVICE, AND COMPUTER READABLE MEDIUM FOR FORMING AN IMAGE BASED ON SPATIAL FREQUENCY COMPONENTS

BACKGROUND

Image capture is the process of obtaining a digital image from a scene or a hard copy image such as an image printed on paper. This involves detecting light reflected from, or transmitted by or through the object of which the image is to be obtained.

In many situations, it is advantageous to increase the rate at which images can be obtained. This is the case, for example, with document scanners. However, as the throughput of a document scanner is increased, the available exposure time for each document decreases. This decrease in exposure time can result in increased image noise or the requirement for better quality optics which in turn increase the cost of manufacturing a document scanner.

US2007/0053022 discloses an image scanning apparatus that includes three color line sensors for outputting red, green, and blue color signals, a monochrome line sensor for outputting a monochrome signal having a higher resolution than the color signals, and a resolution enhancement processor. The resolution enhancement processor enhances a resolution of a pixel strength of the color signals, based on a monochrome smoothed value obtained by smoothing a signal of an arbitrary pixel of the monochrome signal and signals of pixels around the arbitrary pixel and a color smoothed value obtained by smoothing a signal of a pixel of each color signal and signals of pixels around the pixel of the color signal, the pixel of the color signal corresponding to the position of the arbitrary pixel of the monochrome signal.

SUMMARY OF THE INVENTION

According to an embodiment of the invention there is provided an image processing method. The method comprises obtaining first, second, and third image planes from image sensor. The first image plane is formed from light of a first spectral distribution, the second image plane is formed from light of a second spectral distribution, and the third image plane is formed from light of a spectral distribution which substantially covers the visible spectrum. First spatial frequency components are generated from the first, second and third image planes. A second spatial frequency component is generated from the third image plane. A color transform is applied to the first spatial frequency components from the first, second and third image planes to obtain at least first, second and third transformed first spatial frequency image planes. The at least first, second and third transformed first spatial frequency image planes are combined with the second spatial frequency component from the third image plane to form an image.

BRIEF DESCRIPTION OF THE DRAWINGS

In the following, embodiments of the invention will be described, by way of example only making, and with reference to the drawings in which.

DETAILED DESCRIPTION

Figure 1:
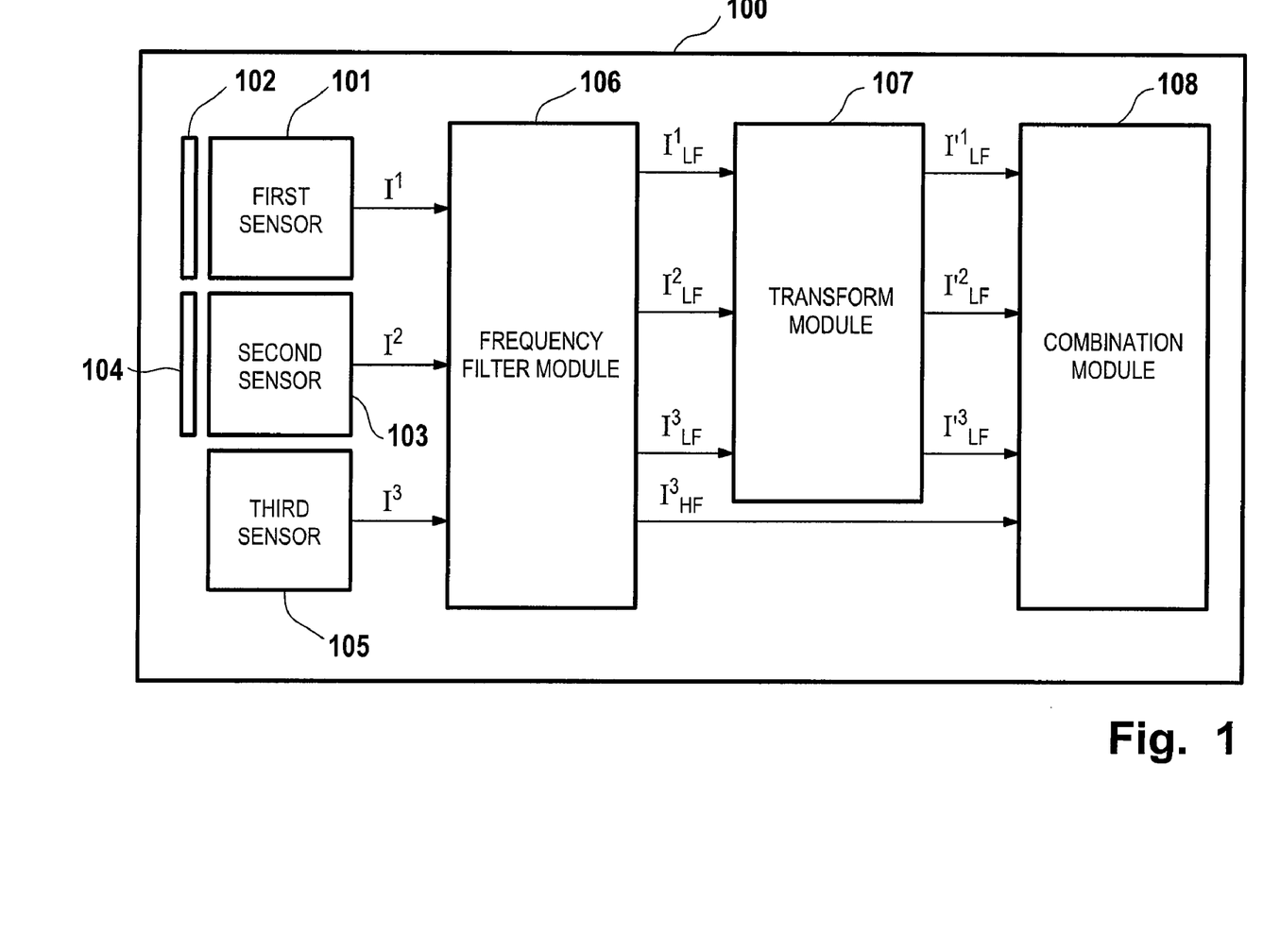
FIG. 1 is a block diagram of an image capture device.

FIG. 1 illustrates a block diagram of an image capture device 100. The image capture device 100 comprises a first sensor 101 for recording a first image plane $I^1$. The first sensor 101 is covered by a first color filter 102. The output of the first sensor 101 is an image plane $I^1$ which records monochrome intensities of light incident on pixels. The second sensor 103 is covered by a second color filter 104, and has output $I^2$. The third sensor 105 is not covered by a color filter. The output of the third sensor $I^3$ therefore represents a white channel, which gives a grayscale image. The outputs of the first and second sensors, $I^1$ and $I^2$ respectively give individual color channels the colors of which are dictated by the colors of filters 102 and 104. The first sensor 101, the second sensor 103, and the third sensor 105 may be charge coupled devices, active pixel sensors, photodiodes or other photo sensors known to a person skilled in the art. The first sensor 101, the second sensor 103 and the third sensor 105 may be combined on a single die, where each sensor comprises one or more linear rows, this is typically the case in a scanner. Alternatively, the three image planes may be arranged as a 2D gird on 1, 2, or 3 separate physical devices, this arrangement is often used in digital cameras. For a single device solution the three sensors that comprise the separate image planes may be interleaved to form a mosaic such as the Bayer mosaic used in many consumer image devices. For a 2 device solution, which is typically called a 2CCD system, the unfiltered white sensor may form a single 2D device with the other 2 colors captured on the other device. A 3CCD system may also be used with separate 2D devices to capture each of the 3 image planes. The image capture device 100 also includes a frequency filter module 106. The frequency filter module 106 obtains low spatial frequency image planes $I^1_{LF}$, $I^2_{LF}$, and $I^3_{LF}$ from the outputs of the first, second and third sensors $I^1$, $I^2$, and $I^3$ respectively. The frequency filter module also obtains a high spatial frequency component $I^3_{HF}$ from the output of a third sensor 105, $I^3$. The transform module 107 transforms the low spatial frequency components $I^1_{LF}$, $I^2_{LF}$, and $I^3_{LF}$ into transformed low spatial frequency image planes $I'^1_{LF}$, $I'^2_{LF}$ and $I'^3_{LF}$. The combination module 108 combines the transformed low spatial frequency image planes $I'^1_{LF}$, $I'^2_{LF}$ and $I'^3_{LF}$ with the high-frequency component of the third image plane $I^3_{HF}$.

The image capture device 100 shown in FIG. 1 has the advantage that the transform applied by the transform module 107 is applied only to the low spatial frequency components of the image planes and thus no noise is introduced into the high spatial frequency component $I^3_{HF}$. As the low frequency components are themselves low noise by virtue of the low pass filtering that has been applied to them, then any amplification of the noise that results from the color transform will be of limited amplitude. Thus the total noise that is present in the final image that results from the combination of the low and high frequency components will be relatively small as each component is independently low noise. The high spatial frequency component is monochrome as the third sensor is not filtered, this approach is appropriate to the human visual system as the human eye is more sensitive to high spatial frequency achromatic signals and less sensitive to high spatial frequency color information. This approach has the additional advantage that color fringing around black and white text is reduced.

Figure 2:
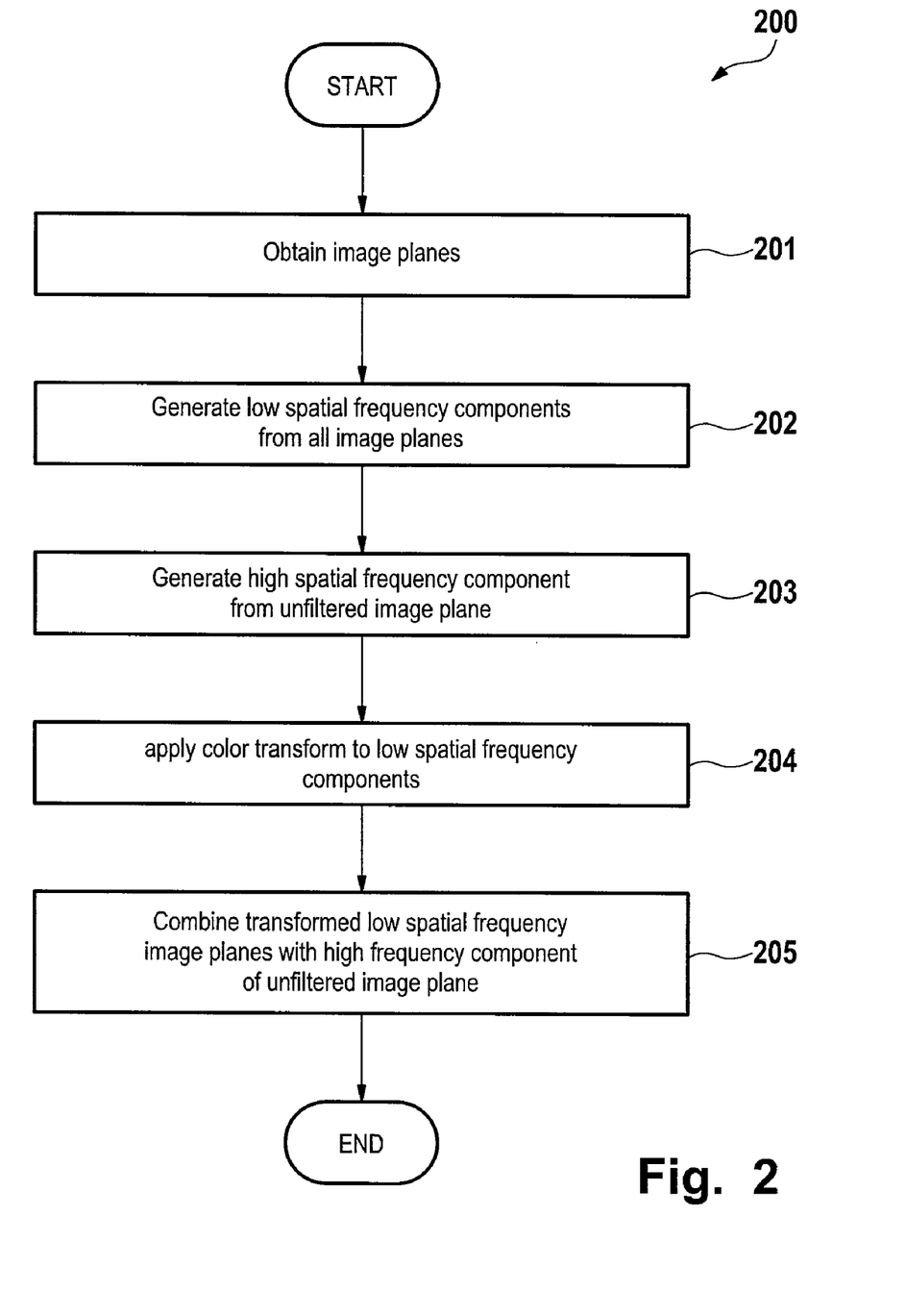
FIG. 2 is a flow diagram illustrating steps involved in an image processing method.

FIG. 2 shows a method 200 for using an image capture device such as that shown in FIG. 1. In step 201 image planes are obtained from the first, second and third sensors. The first image plane $I^1$ from the first sensor 101 and the second image plane $I^2$ from the second sensor 103 represent color channels the colors of which are determined by the colors of filters 102 and 104. A third image plane $I^3$ represents a white color channel as the third sensor 105 is not filtered. In step 202, low spatial frequency components are generated from all image planes. This may be achieved by applying a spatial low pass filter to each of the image planes. In step 203 a high spatial frequency component is generated from the unfiltered image plane $I^3$. This may be achieved by applying a spatial high pass filter to the third image plane $I^3$, or alternatively it may be achieved by subtracting the low spatial frequency component of the third image plane $I^3$ from the image plane $I^3$. In step 204 a color transform is applied to the low spatial frequency components. The color transform applied by transform module 107 may be a matrix that transforms the low spatial frequency image planes $I^1{}_{LF}$, $I^2{}_{LF}$, and $I^3{}_{LF}$ into a color space. The color space may be the RGB color space, a variant of the RGB color space such as sRGB, the XYZ color space, the CMYK color space, or another color space known to a person of skill in the art. In step 205 the transformed low spatial frequency image planes are combined with the high-frequency component of the unfiltered image plane $I^3{}_{HF}$. The output of the combination module 108 is an image.

Figure 3:
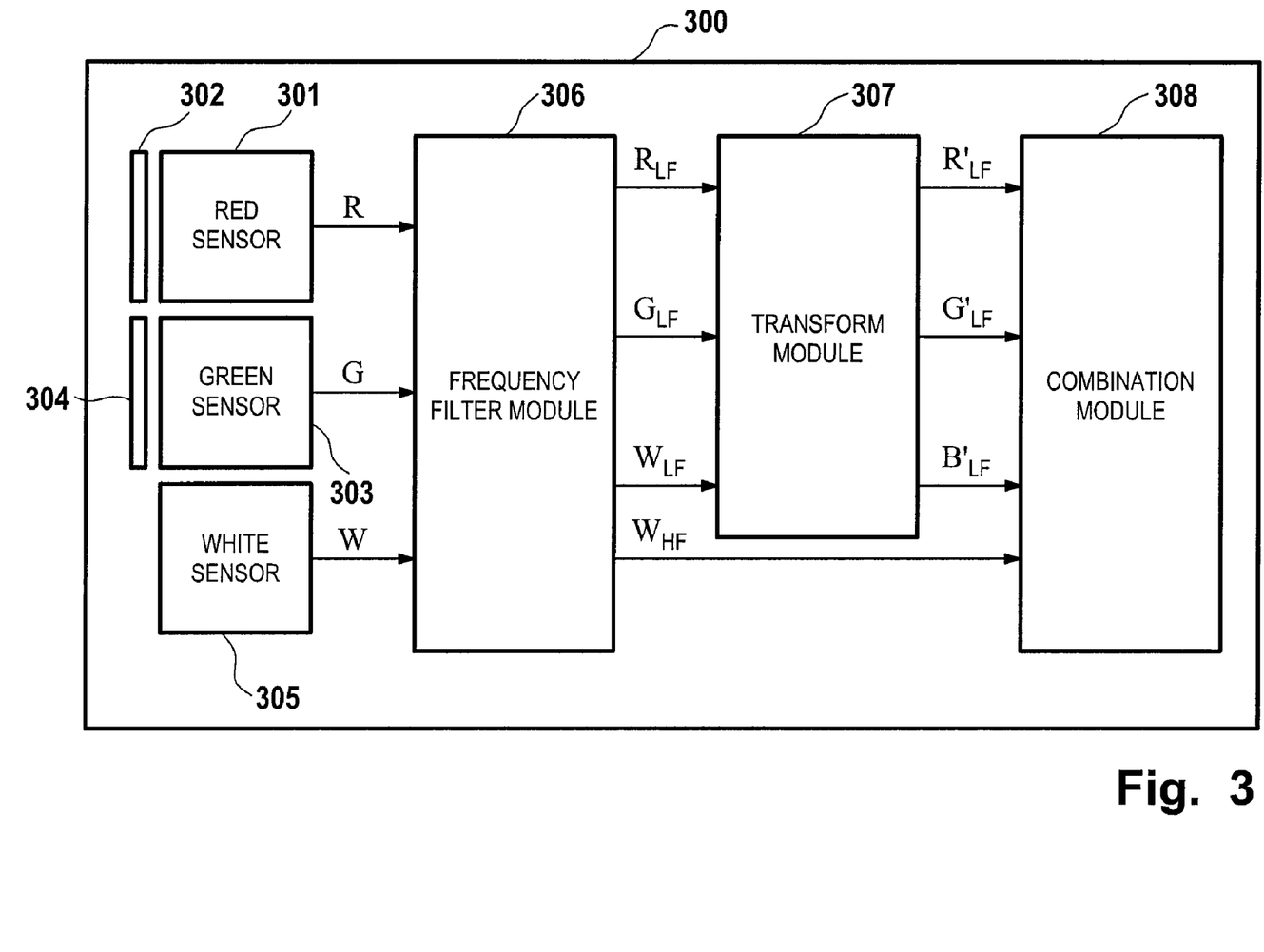
FIG. 3 is a block diagram of an image capture device.

FIG. 3 shows an image capture device such as that shown in FIG. 1 where the first color filter is a red filter 302 making the first sensor a red sensor 301. Similarly the second color filter 304 is a green color filter making the second sensor a green sensor 303. The third sensor is unfiltered and therefore is a white sensor 305. The outputs of the sensors 301, 303 and 305 are therefore a red color plane R, a green color plane G and a white color plane W. The frequency filter module 306 generates in step 202 low spatial frequency image planes $R_{LF}$, $G_{LF}$ and $W_{LF}$, these are red, green and white low spatial frequency image planes respectively. The frequency filter module 306 generates in step 203 a white high-frequency image plane $W_{HF}$. The transform module 307 applies a color transform in step 204 to obtain red, green and blue low spatial frequency image planes $R'_{LF}$, $G'_{LF}$ and $B'_{LF}$ respectively. These low spatial frequency image planes are combined with the white high-frequency image plane by the combination module 308 in step 205.

The image capture device 300 shown in FIG. 3 has the advantage when compared to a image capture device having red, green and blue sensors that the overall sensitivity of the sensor is increased as the blue channel of a RGB sensor has the lowest sensitivity due to the poor spectral properties of a silicon CCD pixel sensor at the blue end of the spectrum.

Alternatively the green color filter 304 may be replaced by a blue color filter. This would make the green sensor 303 a blue sensor. Such an image capture device would require a less extreme color correction by the transform module 307. However it would suffer from a noisy blue channel.

Figure 4:
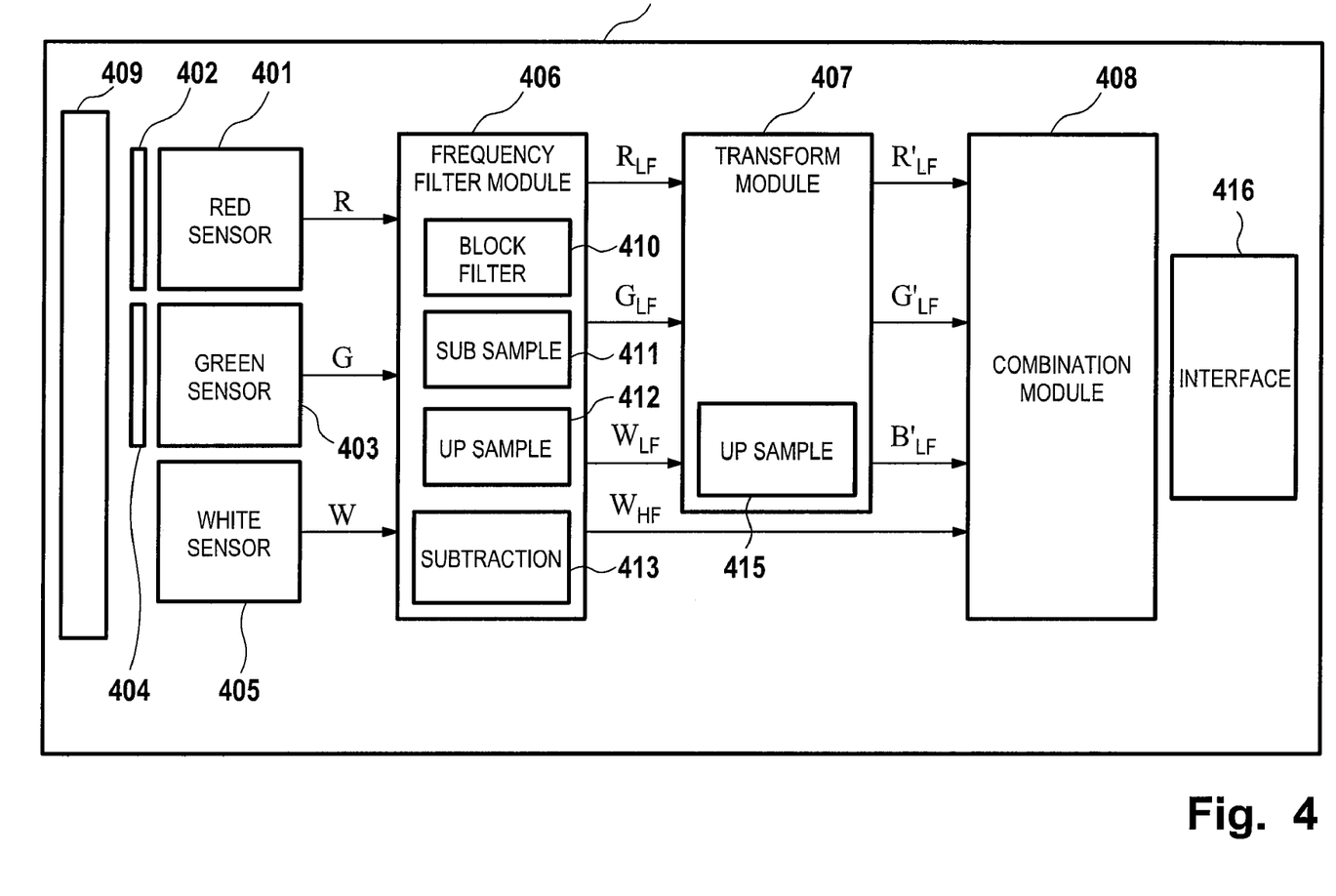
FIG. 4 is a block diagram of a scanner.

FIG. 4 shows a scanner 400. The scanner 400 includes paper holder and optics 409, this may include a sheet feeder, and means to hold the paper or similar in place while it is being scanned. The scanner 400 may additionally include a lamp or other illumination means to illuminate the paper held in paper holder 409. The red sensor 401, the green sensor 403 and the white sensor 405 function in the same manner as red sensor 301, green sensor 303 and white sensor 305 of FIG. 3. The frequency filter module 406 includes a block filtering function 410, a sub-sample function 411, an up-sample module 412 and a subtraction module 413. The low spatial frequency components of the red, green and white color planes, $R_{LF}$, $G_{LF}$ and $W_{LF}$ respectively are obtained by block filtering and sub-sampling the red, green and white image planes R, G and W respectively. While many other low pass spatial filters could be used to obtain the low spatial filter components, we prefer to use the block averaging filter for computational reasons. The white high spatial frequency image plane is obtained by up-sampling the white low frequency image plane $W_{LF}$ using up-sample function 412 and then subtracting the up-sampled white low spatial frequency image plane from the white image plane W using the subtraction function 413. The transform module 407 includes up-sample function 415. The up-sample module 415 is used to up-sample the red, green and blue low spatial frequency image planes once they have been transformed from the red, green and white low frequency image planes. This has the advantage that the transform module 407 has a reduced processing requirement as the transform only has to be applied to the smaller sub-sampled image planes. The up-sampled image planes $R'_{LF}$, $G'_{LF}$ and $B'_{LF}$ are combined with the white high spatial frequency image plane $W_{HF}$ by the combination module 408. The final image is output by the interface 416. The interface 416 may connect to a personal computer either directly or via a network. Alternatively the interface 416 may connect to a storage device such as a CD or DVD drive, or a solid state storage device such as a memory card, where the image may be stored for example as a JPEG file.

Figure 5:
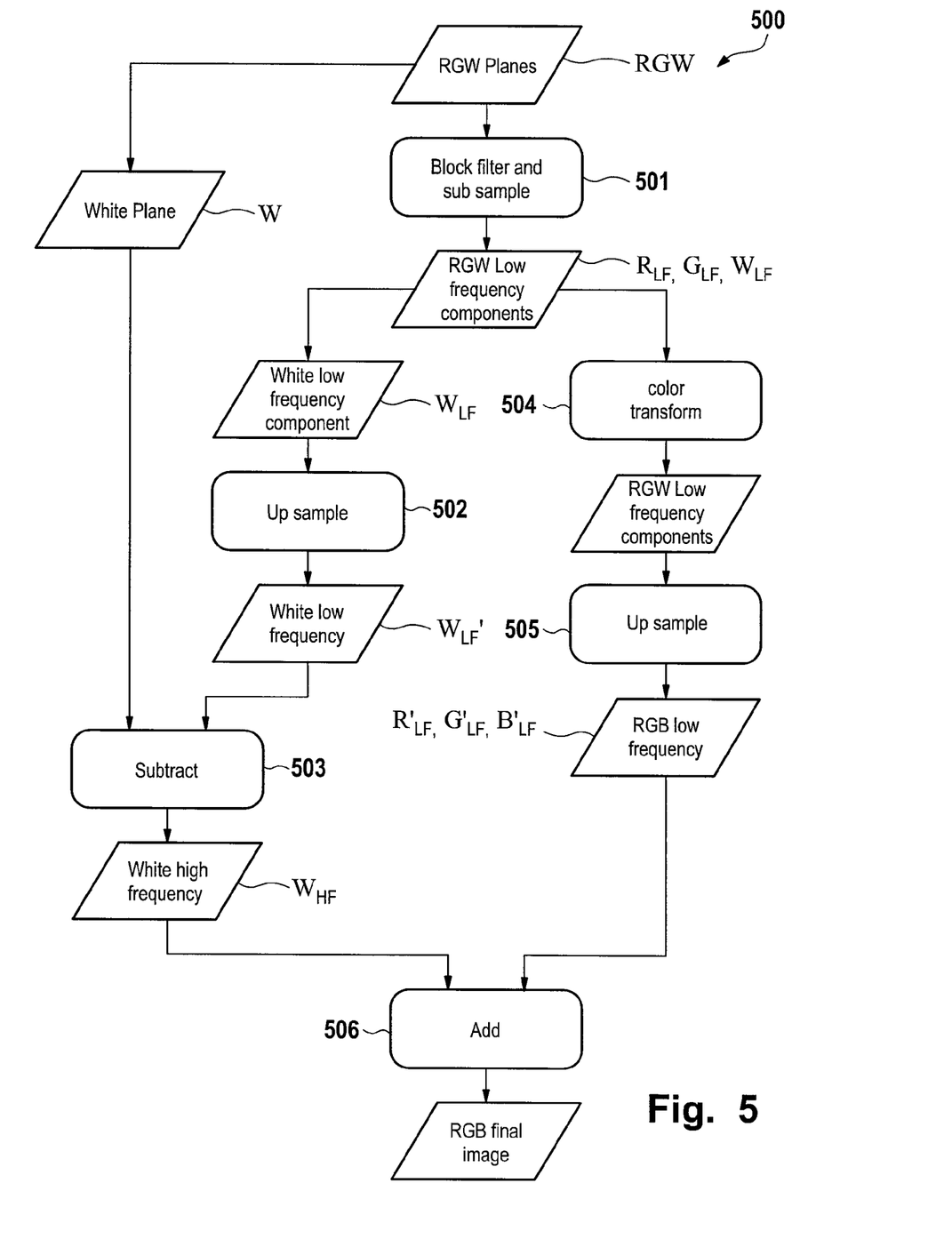
FIG. 5 is a flow diagram showing steps involved in an image processing method.

FIG. 5 shows an image processing method 500 for use with scanner 400 shown in FIG. 4. Referring now to FIG. 5, the red, green and white planes RGW are block filtered and sub-sampled in step 502 to obtain a white low spatial frequency image plane $W_{LF}'$ having the same resolution as the white image plane W. In step 503, the white low spatial frequency image plane $W_{LF}'$ is subtracted from the white image plane W to obtain a white high spatial frequency image plane $W_{HF}$. In step 504, a color transform is applied to the red, green and white low spatial frequency components in order to obtain red, green and blue low spatial frequency components. These are then up-sampled in step 505 to obtain low spatial frequency red, green and blue image planes having the same resolution as the white high-frequency image plane. In step 506, the up-sampled red, green and blue low spatial frequency image planes are added to the white high-frequency image plane in order to obtain a final image.

The red sensor 401 and the green sensor 403 may have a different pixel size to the white sensor 405. This may be achieved by binning the pixels in the red sensor 401 or the green sensor 403 together. Such an approach is advantageous as the intensity of light incident on sensors 401 and 403 will be reduced by the presence of filters 402 and 404, the effects of noise in the R and G signals will therefore be greater than in the W signal when the pixel size of the sensors is the same.

Figure 6:
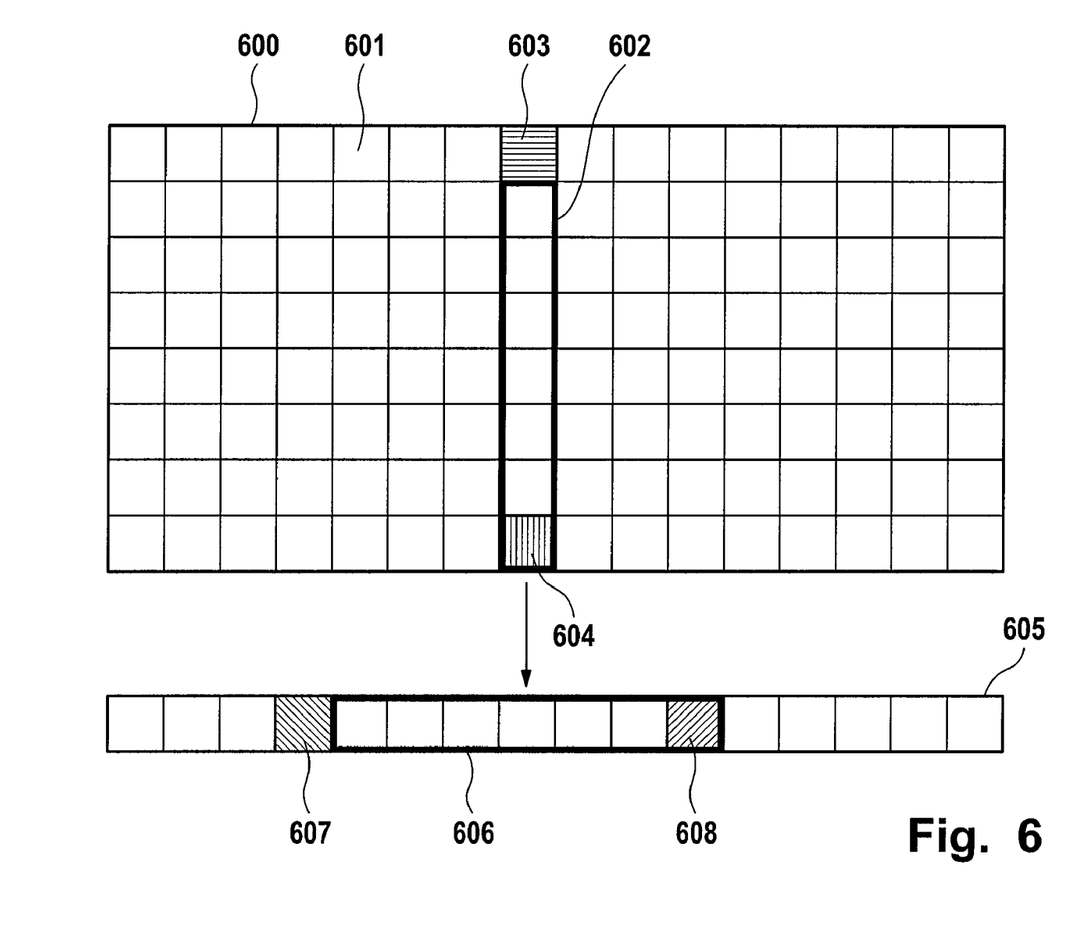
FIG. 6 illustrates a method for calculating partial sums.

FIG. 6 shows a method for calculating the block filtered image for step 501 using partial sums. An image plane 600 includes a number of pixels such as 601 representing densities. In order to calculate block averages over blocks of pixels of image plane 600, partial sums such as 607 and 608 can be stored making a computationally efficient processing method. In order to calculate the partial sum for the pixels enclosed by rectangle 602, the value of pixel 603 must be subtracted from a previous partial sum and the value of pixel 604 must be added to the value of that previous partial sum. Thus the partial sum over pixels enclosed by rectangle 602 can be obtained from a previous partial sum with only one addition and one subtraction. A number of partial sums are stored in partial sum buffer 605 in order to add partial sums over columns such as that shown as 602. Thus in order to calculate the total over a block, a partial sum over columns can be used, with the subtraction of partial sum 607 and the addition of partial sum 608 required. The block average is then calculated from the block total by dividing by the number of pixels. Alternatively, the block totals may not be scaled until after sub-sampling has occurred in order to reduce the processing requirements.

Block filtering over odd sided blocks ensures that the block filtered image is centered over the same pixel locations as the original. This is desirable if the down-sampled image is to be up-sampled using bilinear interpolation. If even-sided blocks are used in the block filtering, a 0.5 pixel shift in the X and Y directions with respect to the original image will result. This is optimal when nearest neighbor interpolation is used for the up-sampling.

In the embodiments described above, the modules may be implemented as hardware or as software. Further, while the processing modules are shown as being integrated in an image capture device or scanner, the processing could also take place on a connected computer. The processing of images and image planes obtained from the sensors may take place on the fly with image data being processed for one section of an image while another section of the image is being scanned by the sensors.

While the three image planes are captured by different sensors in the embodiments described above, the method may also be applied to an image capture device having a unfiltered single sensor, with the 3 image planes being captured using different illumination devices such as red, blue and white LEDs.

| List of Reference Numerals | |
|---|---|
| 100 | Image capture device |
| 101 | First sensor |
| 102 | First color filter |
| 103 | Second sensor |
| 104 | Second color filter |
| 105 | Third sensor |
| 106 | Frequency filter module |
| 107 | Transform module |
| 108 | Combination module |
| 200 | Method |
| 201 | Obtain image planes |
| 202 | Generate low spatial frequency components |
| 203 | Generate high spatial frequency component |
| 204 | Apply color transform |
| 205 | Combine |
| 300 | Image capture device |
| 301 | Red sensor |
| 302 | Red filter |
| 303 | Green sensor |
| 304 | Green filter |
| 305 | White sensor |
| 306 | Frequency filter module |
| 307 | Transform module |
| 308 | Combination module |
| 400 | Scanner |
| 401 | Red sensor |
| 402 | Red filter |
| 403 | Green sensor |
| 404 | Green filter |
| 405 | White sensor |
| 406 | Frequency filter module |
| 407 | Transform module |
| 408 | Combination module |
| 409 | Paper holder and optics |
| 410 | Block filter |
| 411 | Sub sample |
| 412 | Up sample |
| 413 | Subtraction |
| 415 | Up sample |
| 416 | Interface |
| 500 | Method |
| 501 | Block filter and sub sample |
| 502 | Up sample |
| 503 | Subtract |
| 504 | Color transform |
| 505 | Up sample |
| 506 | Add |
| 600 | Image plane |
| 601 | Pixel |
| 602 | Partial sum over pixels |
| 603 | Pixel |
| 604 | Pixel |
| 605 | Partial sum buffer |
| 606 | Partial sum over block |
| 607 | Partial sum over pixels |
| 608 | Partial sum over pixels |

The invention claimed is:

1. An image processing method comprising:
obtaining first, second and third image planes from at least one image sensor, the first image plane formed from light of a first spectral distribution, the second image plane formed from light of a second spectral distribution, and the third image plane formed from light of a spectral distribution which substantially covers the visible spectrum;
generating first spatial frequency components from the first, second and third image planes;
generating a second spatial frequency component from the third image plane;
applying a color transform to the first spatial frequency components from the first, second and third image planes to obtain at least first, second and third transformed first spatial frequency image planes;
combining the at least first, second and third transformed first spatial frequency image planes with the second spatial frequency component from the third image plane to form an image.

2. The image processing method of claim 1, the step of generating a second spatial frequency component from the third image plane comprising subtracting the first spatial frequency signal for the third image plane from the third image plane.

3. The image processing method of claim 1, the step of generating first spatial frequency components from the first, second and third image planes comprising filtering using a spatial low pass filter.

4. The image processing method of claim 1, the step of generating first spatial frequency components from the first, second and third image planes comprising block averaging and sub sampling the first, second and third image planes.

5. The image processing method of claim 4, further comprising the step of up sampling the transformed first spatial frequency color planes.

6. The image processing method of claim 1, the color transform being a transform to a color space, the color space being the RGB, CYMK, XYZ or sRGB color space.

7. An image capture device comprising:
a sensor module operable to generate first, second and third image signals, the first image signal representing light intensity of a first spectral distribution, the second image signal representing light intensity of a second spectral distribution and the third image signal representing light intensity of a spectral distribution substantially covering the visible spectrum;

a frequency filter module operable to produce first spatial frequency components from the first, second and third image signals and a second spatial frequency component from the third image signal;

a color transform module to transform the first spatial frequency components of the first, second and third image signals;

a combination module to combine the transformed first spatial frequency components and the second spatial frequency component from the third image signal.

8. The image capture device of claim 7, the sensor module comprising first, second and third image sensors, the first image sensor having a first color filter to capture the first image signal, the second image sensor having a second color filter to capture the second image signal, and the third image sensor being substantially spectrally unfiltered to capture the third image signal.

9. The image capture device of claim 8, the first color filter being red and the second color being green.

10. The image capture device of claim 8, the first color filter being red and the second color being blue.

11. The image capture device of claim 7, the frequency filter module operable to obtain the first spatial frequency components of the image signals by block filtering.

12. The image capture device of claim 11, the frequency filter module comprising storage for a plurality of partial sums.

13. The image capture device of claim 11, the frequency filter module operable to down sample the first spatial frequency components of the image signals, and the combination module operable to up sample the transformed first spatial frequency components.

14. The image capture device of claim 13, wherein the frequency filtering module is operable to block average over blocks having sides of an odd number of pixels and the combination module is operable to up sample using bilinear interpolation.

15. The image capture device of 13, wherein the frequency filtering module is operable to block average over blocks having sides of an even number of pixels and the combination module is operable to up sample using nearest neighbor interpolation.

16. The image capture device of claim 8, wherein the first and second image sensors are lower in spatial resolution than the third image sensor.

17. The image capture device of claim 7 being a scanner.

18. The image capture device of claim 7, the sensor module comprising a single sensor; the image capture device further comprising an illumination component operable to produce an illumination of the first spectral distribution, the second spectral distribution and an illumination which substantially covers the visible spectrum.

19. A non-transitory computer-readable medium comprising instructions which, when executed by a computer, cause the computer to perform operations comprising:

obtaining first, second and third image planes from an image capture device, the first image plane formed from light of a first spectral distribution, the second image plane formed from light of a second spectral distribution, and the third image plane formed from light of a spectral distribution which substantially covers the visible spectrum;

generating first spatial frequency components for the first, second and third image planes;

generating a second spatial frequency component from the third image plane;

transforming the first spatial frequency components from the first, second and third planes into a color space;

combining the transformed first spatial frequency components with the second spatial frequency component.

20. The computer-readable medium of claim 19, wherein the operations further comprise controlling the image capture device to capture the first, second and third image planes.

* * * * *